United States Patent [19]
Allen

[11] Patent Number: 5,999,755
[45] Date of Patent: Dec. 7, 1999

[54] CAMERA WITH FRAME COUNTER READABLE AT SEPARATE LOCATIONS

[75] Inventor: Loretta E. Allen, Hilton, N.Y.

[73] Assignee: Eastman Kodak Company, Rochester, N.Y.

[21] Appl. No.: 09/189,970

[22] Filed: Nov. 10, 1998

[51] Int. Cl.⁶ .................................................. G03B 17/24
[52] U.S. Cl. ............................................................ 396/284
[58] Field of Search ..................................... 396/284, 296, 396/317, 537

[56] References Cited

U.S. PATENT DOCUMENTS

| | | |
|---|---|---|
| 422,686 | 3/1890 | Altick . |
| 1,219,672 | 3/1917 | Schoenleber . |
| 2,585,451 | 2/1952 | Frankel . |
| 3,677,147 | 7/1972 | Kremp et al. . |
| 3,836,691 | 9/1974 | Wolfe . |
| 4,114,172 | 9/1978 | Yao . |
| 4,645,322 | 2/1987 | Stella et al. . |
| 5,276,470 | 1/1994 | Fridman .................................. 396/317 |
| 5,339,125 | 8/1994 | Fridman et al. . |
| 5,758,197 | 5/1998 | Cipolla et al. .......................... 396/284 |

Primary Examiner—David M. Gray
Attorney, Agent, or Firm—Roger A. Fields

[57] ABSTRACT

A camera comprising a rear opening, and a flexible web frame counter supported for movement to be within direct view through the opening to see exposure related indicia of the frame counter when looking through the rear opening, is characterized in that:

a top opening is positioned to permit the frame counter to be within direct view through the top opening to see the exposure related indicia when looking through the top opening.

7 Claims, 3 Drawing Sheets

CAMERA WITH FRAME COUNTER READABLE AT SEPARATE LOCATIONS

CROSS REFERENCE TO RELATED APPLICATIONS

Reference is made to commonly assigned copending applications Ser. No. 09/188,965, entitled COMPACT CAMERA WITH FRAME COUNTER MADE FLEXIBLE TO CONSERVE SPACE and filed Nov. 10, 1998 in the names of Loretta E. Allen and Dennis R. Zander, and Ser. No. 09/189,457, entitled CAMERA WITH FRAME COUNTER AND VIEWFINDER INTEGRATED TO CONSERVE SPACE and filed Nov. 10, 1998 in the namesof Loretta E. Allen and Roger A. Siekierski.

FIELD OF THE INVENTION

The invention relates generally to the field of photography, and in particular to compact cameras. More specifically, the invention relates to a camera with a frame counter that is readable at separate locations on the camera.

BACKGROUND OF THE INVENTION

Film and cameras that are all in one, commonly referred to as one-time-use cameras, have become well known. The one-time-use camera is a simple point-and-shoot type comprising a plastic main body part which supports a conventional film cassette in a cassette receiving or film take-up chamber, an unexposed film roll prewound on a film spool in a film supply chamber from the film cassette, a fixed-focus taking lens, a film metering mechanism with a rotatably supported metering sprocket that engages the filmstrip, a manually rotatable film winding thumbwheel rotataby engaged with a film spool inside the film cassette, a single-blade shutter, a manually depressible shutter release button, a rotatable frame counter disk or wheel for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cassette. This winds an exposed section of the filmstrip into the film cassette. The rewinding movement of the filmstrip the equivalent of slightly more than one frame width rotates the metering sprocket in engagement with the filmstrip to decrement the frame counter disk to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cassette, the one-time-use camera is given to a photofinisher who tears the outer box off the camera unit, separates the rear cover part from the main body part, and removes the film cassette with the exposed filmstrip from the film take-up chamber. Then, he removes the exposed filmstrip from the film cassette to develop the negatives and make prints for the customer. At least some of the used camera parts may be recycled, i.e. reused, to remanufacture the camera

Problem

Since the one-time-use camera is relatively compact, one's fingers can partially cover the frame counter disk when the camera is hand-held. Thus, the frame counter disk may be difficult to read.

The Cross-Referenced Applications

Cross-referenced application Serial No. [our Docket No. RAF], entitled COMPACT CAMERA WITH FRAME COUNTER MADE FLEXIBIE TO CONSERVE SPACE discloses a compact camera comprising a frame counter disk supported for rotation to indicate the number of exposures remaining to be made on a filmstrip, characterized in that the frame counter disk is flexible, has a curved periphery, is bent along a straight line joining two spaced points on the curved periphery to be located in two different planes in order to conserve space, and has a plurality of exposure related indicia that is moved successively from one of the planes to the other plane as the frame counter disk is rotated.

Cross-referenced application Serial No. [our Docket No. RAF], entitled CAMERA WITH FRAME COUNTER AND VIEWFINDER INTEGRATED TO CONSERVE SPACE discloses a compact camera which comprises a viewfinder having a pair of spaced front objective and rear eye lenses for viewing a subject to be photographed when one's eye is brought close to the rear eye lens to look at the subject through the viewfinder, and a frame counter supported for movement in a space between the front objective and rear eye lenses to view exposure related indicia of the frame counter when looking through the viewfinder, characterized in that the frame counter has a transparent carrier for the exposure related indicia which is movable adjacent the rear eye lens to permit the exposure related indicia to be viewed through the viewfinder only when one's eye is farther from the rear eye lens than when one's eye is brought close to the rear eye lens to look at the subject to be photographed and to permit one to view the subject without seeing the exposure related indicia when one's eye is brought close to the rear eye lens.

SUMMARY OF THE INVENTION

According to the invention, a camera comprising a rear opening, and a frame counter supported for movement to view exposure related indicia of the frame counter when looking through the rear opening, is characterized in that:

a top opening is positioned to permit the exposure related indicia to be viewed when looking through the top opening in addition to being viewed when looking through the rear opening.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
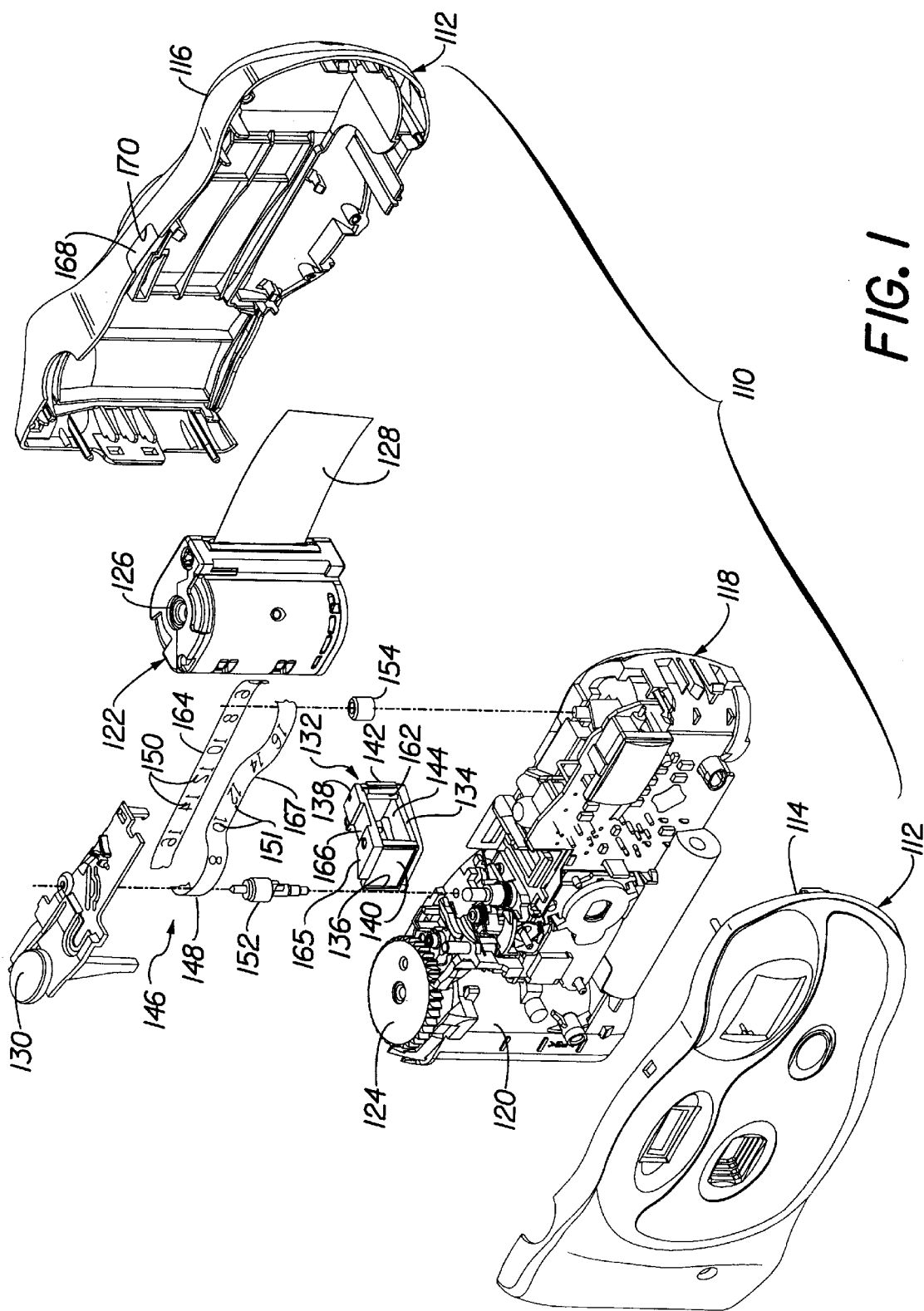
FIG. 1 is an exploded front perspective view of a one-time-use camera according to a preferred embodiment of the invention.

Referring now to the drawings, FIG. 1 shows a one-time-use camera 110 in which an opaque camera housing 112 constitutes a front cover part 114 and a rear cover part 116. The front cover part 114 and the rear cover part 116 are connected to one another and to a main body part 118 to house the main body part between them.

The main body part 118 has a cassette receiving or film take-up chamber 120 for a known film cassette 122. A film winding thumbwheel 124 rotatably supported on the main body part is 118 is coaxially engaged with a film spool 126 inside the film cassette 122. After each picture is taken with the one-time-use camera 110, the photographer manually rotates the thumbwheel 124 in a film winding direction, counter-clockwise in FIG. 1, to similarly rotate the film spool 126 inside the film cassette 122. This winds an exposed section of a filmstrip 128 into the film cassette 122. A cantilevered shutter release button 130 is supported on the main body part 118 to be manually depressed to initiate picture-taking.

An optical viewfinder 132 has an open box-like skeletal frame 134 that is connected to the main body part 118. The skeletal frame 134 has an open front 136 and an open rear 138 in which a front objective lens 140 and a rear eye lens 142 are fixed. An air space 144 within the skeletal frame 134 separates the front objective and rear eye lenses 140 and 142. As is typical, a subject to be photographed is viewed through the viewfinder 132 when one's eye is brought close to, i.e. within approximately an inch of, the rear eye lens 142 to look at the subject through the viewfinder.

Figure 2:
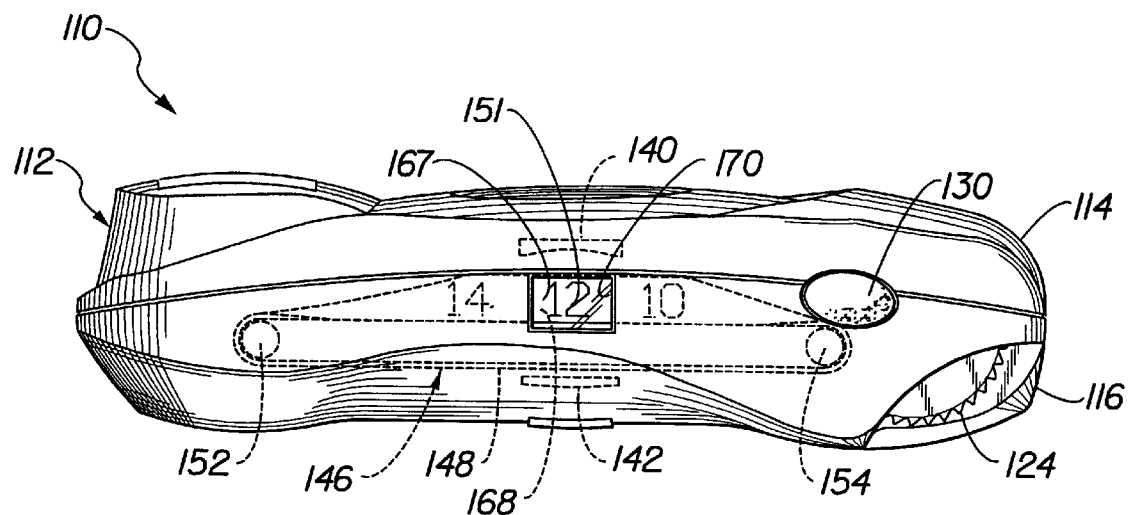
FIG. 2 is a top plan view of the one-time-use camera.
Figure 3:
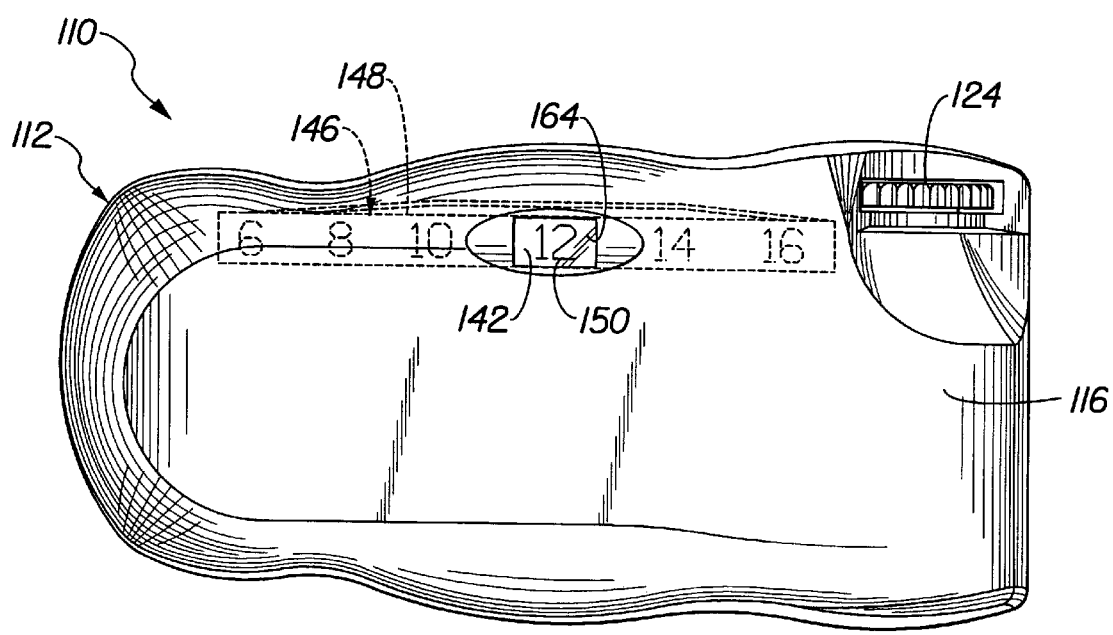
FIG. 3 is a rear elevation view of the one-time-use camera.
Figure 4:
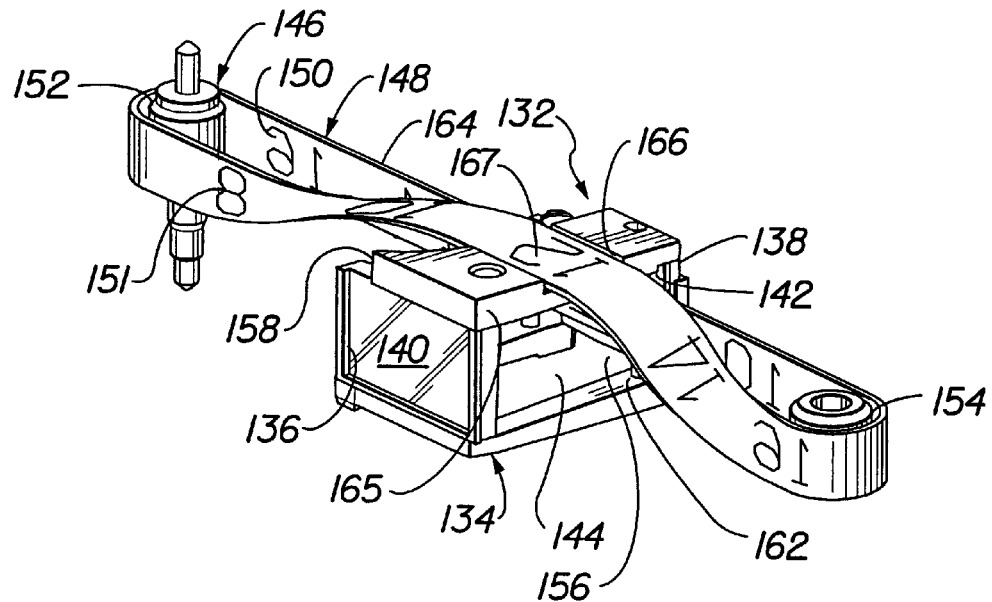
FIG. 4 is a front perspective view of a frame counter that is readable at separate locations in the one-time-use camera.
Figure 5:
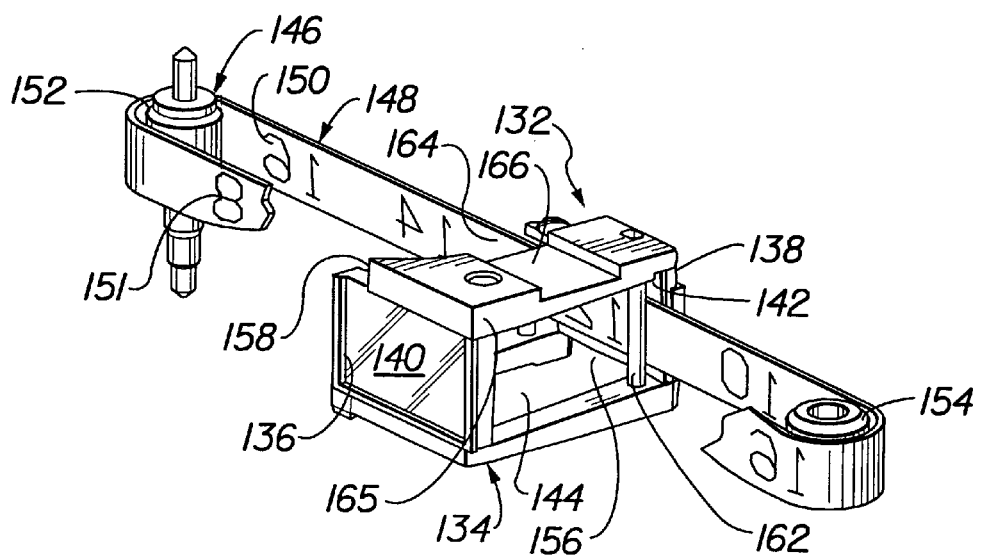
FIG. 5 is a front perspective view of the frame counter of FIG. 4, but with a longitudinal portion of the frame counter removed for illustration purposes.

As shown in FIGS. 1–5, a frame counter 146 for indicating the number of exposures remaining to be made on the filmstrip 128 is a flexible transparent carrier web 148 formed into a continuous closed loop. The carrier web 148 has a two identical sets of exposure related opaque indicia 150 and 151 along successive short longitudinal portions of the carrier web, and extends lengthwise partially around a pair of parallel axis drive and idler pulleys 152 and 154 to support the carrier web for rotation partially around the pulleys. The drive pulley 152 is rotated in a known way, for example via a gear connection with the film winding thumbwheel 124 or via a coaxial connection with a metering sprocket (not shown). When the photographer manually rotates the thumbwheel 124 in the film winding direction, counter-clockwise in FIG. 1, to similarly rotate the film spool 126 inside the film cassette 122, to wind an exposed section of a filmstrip 128 into the film cassette 122, the carrier web 148 is incrementally moved through opposite open sides 156 and 158 of the skeletal frame 134 to similarly move across the air space 144 between the front objective and rear eye lenses 140 and 142. A pair of parallel rear guide pins 162 (only one shown) proximate the rear eye lens 142 support successive rear short longitudinal portions 164 of the carrier web 148 adjacent (in front of in FIGS. 4 and 5) the rear eye lenses. This is best shown in FIG. 5. A top plate 165 of the skeletal frame 134 has a top guide channel 166 that supports successive top short longitudinal portions 167 of the carrier web 148 over the air space 144 and beneath a top window 168 within a top opening 170 in the rear cover part 116. See FIGS. 2, 4 and 5. The exposure related indicia 150 and 151 on the carrier web 148 can be successively seen, i.e. successively read, through the viewfinder 132 only when one's eye is farther from the rear eye lens 142 than when one's eye is brought close to the rear eye lens to look at the subject to be photographed. Conversely, when one's eye is brought close to the rear eye lens 142 to view the subject the subject to be photographed, the exposure related indicia 150 or 151, because it is close to one's eye, cannot be seen (read). Thus, in FIG. 3, the exposure related indicia 150, which is the number "12" in FIG. 3, can only be seen (read) when one's eye is not brought close to the rear eye lens 142. The exposure related indicia 150 and 151 can be successively seen, i.e. successively read, at the top window 168. Thus, in FIG. 2, the exposure related indicia 151, which is the number "12" in FIG. 2, can be seen (read) at the top window 168. The exposure related indicia 151, which is the number "12" in FIG. 2, is adjacent the top window 168 at the same time that the exposure related indicia 150, which is the number "12" in FIG. 3, is adjacent the rear eye lens 142.

The invention has been described with reference to a preferred embodiment. However, it will be appreciated that variations and modifications can be effected by a person of ordinary skill in the art without departing from the scope of the invention.

PARTS LIST 110. one-time-use camera
112. camera housing
114. front cover part
116. rear cover part
118. main body part
120. cassette receiving chamber
122. film cassette
124. film winding thumbwheel
126. film spool
128. filmstrip
130. shutter release button
132. viewfinder
134. skeletal frame
136. open front
138. open rear
140. front objective lens
142. rear eye lens
144. air space
146. frame counter
148. carrier web
150. exposure related indicia
151. exposure related indicia
152. drive pulley
154. idler pulley
156. open side
158. open side
162. rear guide pins
164. successive rear web portions
165. top plate
166. top guide channel
167. successive top web portions
168. top window 170. top opening

What is claimed is:

1. A camera comprising an exterior viewing opening positioned for a camera user to look through said exterior viewing opening, and a frame counter supported for movement for the camera user to view successive exposure related indicia of said frame counter when the camera user looks through said exterior viewing opening, is characterized in that:

another exterior viewing opening is positioned for the camera user to look through said another exterior viewing opening to view the same one of said exposure related indicia as can then be seen through said exterior viewing opening, when said camera is closed.

2. A camera as recited in claim 1, wherein said frame counter is a flexible web arranged in a continuous closed loop.

3. A camera as recited in claim 1, wherein said exposure related indicia includes two sets of identical indicia, one of said sets arranged to be viewed through said exterior viewing opening at the same time another of said sets can be viewed through said another exterior viewing opening.

4. A camera comprising a rear exterior viewing opening positioned for a camera user to look through said rear exterior viewing opening, and a flexible web frame counter supported for movement to be within direct view through said rear exterior viewing opening for the camera user to see successive exposure related indicia of said frame counter when looking through said rear exterior viewing opening, is characterized in that:

a top exterior viewing opening is positioned for the camera user to look through said top exterior viewing opening to permit said frame counter to be within direct view through said top exterior viewing opening for the camera user to see the same one of said exposure related indicia when looking through said top exterior viewing opening as can then be seen through said rear exterior viewing opening.

5. A camera as recited in claim 4, wherein said flexible web frame counter is a continuous closed loop.

6. A camera as recited in claim 4, wherein said exposure related indicia includes two sets of identical indicia arranged one after the other on said flexible web frame counter to permit said exposure related indicia to be within direct view through said rear and top exterior viewing openings at the same time.

7. A camera as recited in claim 4, wherein one web guide supports said flexible web frame counter beneath said top viewing opening and another web guide supports said flexible web frame counter in front of said rear viewing opening.

* * * * *